United States Patent [19]

Murakawa et al.

[11] Patent Number: 5,560,188
[45] Date of Patent: Oct. 1, 1996

[54] LAWN TRACTOR HAVING A BLOWER UNIT AND A GRASS CLIPPINGS TRANSPORT DUCT

[75] Inventors: Masatake Murakawa; Eriya Harada; Katsuhiko Uemura; Kazuaki Kurohara, all of Sakai, Japan

[73] Assignee: Kubota Corporation, Osaka, Japan

[21] Appl. No.: 410,528

[22] Filed: Mar. 27, 1995

[30] Foreign Application Priority Data

Oct. 20, 1994 [JP] Japan .................................. 6-254881

[51] Int. Cl.⁶ .................................................. A01D 34/70
[52] U.S. Cl. ............................ 56/13.3; 56/16.6; 56/320.2; 56/202
[58] Field of Search ........................... 56/13.3, 13.4, 56/199, 202, 320.2, 14.7, 16.6

[56] References Cited

U.S. PATENT DOCUMENTS

| | | | |
|---|---|---|---|
| 2,849,851 | 9/1958 | Hayter | 56/13.4 X |
| 3,065,588 | 11/1962 | Shaw . | |
| 3,657,865 | 4/1972 | Ober | 56/13.3 |
| 3,969,876 | 7/1976 | Turos . | |
| 4,322,934 | 4/1982 | Doi | 56/11.2 X |
| 4,523,788 | 6/1985 | Prasad . | |
| 4,579,363 | 4/1986 | Allen et al. . | |
| 4,711,073 | 12/1987 | Freier, Jr. et al. . | |
| 4,945,716 | 8/1990 | Murakawa et al. . | |
| 4,996,829 | 3/1991 | Saitoh et al. | 56/202 X |
| 5,064,315 | 11/1991 | Samejima et al. . | |
| 5,107,661 | 4/1992 | Shimamura . | |
| 5,224,327 | 7/1993 | Minoura et al. . | |

Primary Examiner—Terry Lee Melius
Assistant Examiner—Thomas A. Beach
Attorney, Agent, or Firm—Fisher & Associates

[57] ABSTRACT

A lawn tractor has an engine with a vertical output shaft, front wheels and rear wheels, a body frame extending longitudinally of the tractor, a mower unit supported by the body frame, a grass catcher supported the by body frame, a blower unit supported by the body frame, and a duct for transporting grass clippings cut by the mower unit into the grass catcher. The duct includes a first duct portion extending between the mower unit and the blower unit, and a second duct portion extending between the blower unit and the grass catcher. The mower unit has a vertical mower drive shaft for receiving engine power. The blower unit has a vertical blower input shaft for receiving engine power. An intermediate shaft is disposed between the mower unit and blower unit. The intermediate shaft has a first, a second and a third pulleys mounted thereon. The first pulley is drivably connected to the engine output shaft. The second pulley is drivably connected to the mower drive shaft. The third pulley is drivably connected to the blower input shaft.

5 Claims, 4 Drawing Sheets

5,560,188

LAWN TRACTOR HAVING A BLOWER UNIT AND A GRASS CLIPPINGS TRANSPORT DUCT

BACKGROUND OF THE INVENTION

1. Field of the Invention

The present invention relates to a lawn and garden tractor having a mower unit vertically movably attached to a tractor body, a grass catcher attached to the tractor body, a duct for transporting grass clippings cut by the mower unit to the grass catcher, and a blower unit for aiding the transport of grass clippings.

2. Description of the Related Art

A conventional lawn tractor of this type is exemplified by the mid-mount type lawn tractor disclosed in U.S. Pat. No. 5,064,315. This tractor includes a mower unit suspended from a tractor body through a link mechanism or the like. The mower unit has a housing extending transversely of the tractor body, with one end thereof projecting from a right side of the tractor body. A blower unit is fixed to a grass outlet formed in the projecting end of the housing.

In the above conventional construction, however, the center of gravity of the entire mower unit is offset transversely of the tractor body toward the projecting end because of the weight of the blower unit. Thus, the mower unit has an imbalance of weight transversely of the tractor body. During a grass cutting operation, the mower unit tends to dip at one side thereof, resulting in a grass cutting height varying transversely of the tractor body, and in unsteady vertical movement of the mower unit.

These inconveniences may be overcome by employing a construction in which the blower unit is supported by the tractor body instead of the mower unit, thereby to eliminate the imbalance of the mower unit due to the weight of the blower unit. Such a construction requires modifications in a positional relationship of the grass transporting duct to the grass outlet of the mower unit and the blower unit, and in a power transmitting structure from the engine to the mower unit and blower unit. These modifications must be effected without impairing performance or raising cost. For this purpose, it is necessary to seek a new lawn tractor construction, taking into account an arrangement and construction of the duct and blower unit collectively.

One such lawn tractor construction has been proposed by some of inventors in this application and disclosed in U.S. Patent Application No. 08/305951 filed SEP. 29, 1994. In this new lawn tractor, a blower unit is supported by a body frame. The blower unit and mower unit receive engine power through an engine output shaft and a blower input shaft, and through the output shaft and a mower input shaft, respectively. These output shaft and input shafts are arranged longitudinally of the tractor. Further, a first and a second intermediate shafts are arranged between the mower input shaft and blower input shaft. The mower input shaft has three pulleys mounted thereon, which are connected through belts to the engine output shaft, a mower blade drive shaft and the first intermediate shaft, respectively. The first intermediate shaft has two pulleys mounted thereon, which are connected through belts to the mower input shaft and second intermediate shaft, respectively. The second intermediate shaft also has two pulleys, which are connected through belts to the first intermediate shaft and blower input shaft.

SUMMARY OF THE INVENTION

The object of the present invention is to provide an arrangement and construction of a blower unit in a lawn tractor, which allows the blower unit to be supported independently of a mower unit, and a suitable arrangement and construction of a transmission mechanism for transmitting engine power to the mower unit and blower unit.

The above object is fulfilled, according to the present invention, by a lawn tractor including an intermediate shaft disposed between the mower unit and the blower unit and having a first, a second and a third transmission wheels, the first transmission wheel being drivably connected to the vertical output shaft, the second transmission wheel being drivably connected to the mower drive shaft, and the third transmission wheel being drivably connected to the blower input shaft.

With the above construction, the intermediate shaft having the first, second and third transmission wheels can be disposed in a region having a relatively large space allowance between the mower unit and blower unit. Thus, a vacant space in the tractor is effectively used to accommodate a transmission mechanism for transmitting engine power to the mower unit and blower unit. That is, in a lawn and garden tractor having a duct for transporting grass clippings cut by the mower unit into the grass catcher, and a blower unit for aiding the transport of grass clippings, not only the posture and vertical movement of the mower unit are stabilized, but the transmission mechanism for transmitting power from the engine to the mower unit and blower unit is arranged with facility.

In a preferred embodiment of the invention, the mower unit has a bracket mounted on a wall thereof opposed to the blower unit, the intermediate shaft being supported by the bracket, and the third transmission wheel is disposed in a position lower than a ceiling wall of the mower unit. This construction allows a power transmitting member, such as a belt, interconnecting the third transmission wheel and the blower input shaft to extend below an axle case of the tractor.

Other features and advantages of the present invention will be apparent from the following description of an embodiment taken in conjunction with the drawings.

DETAILED DESCRIPTION OF THE PREFERRED EMBODIMENT

Figure 1:
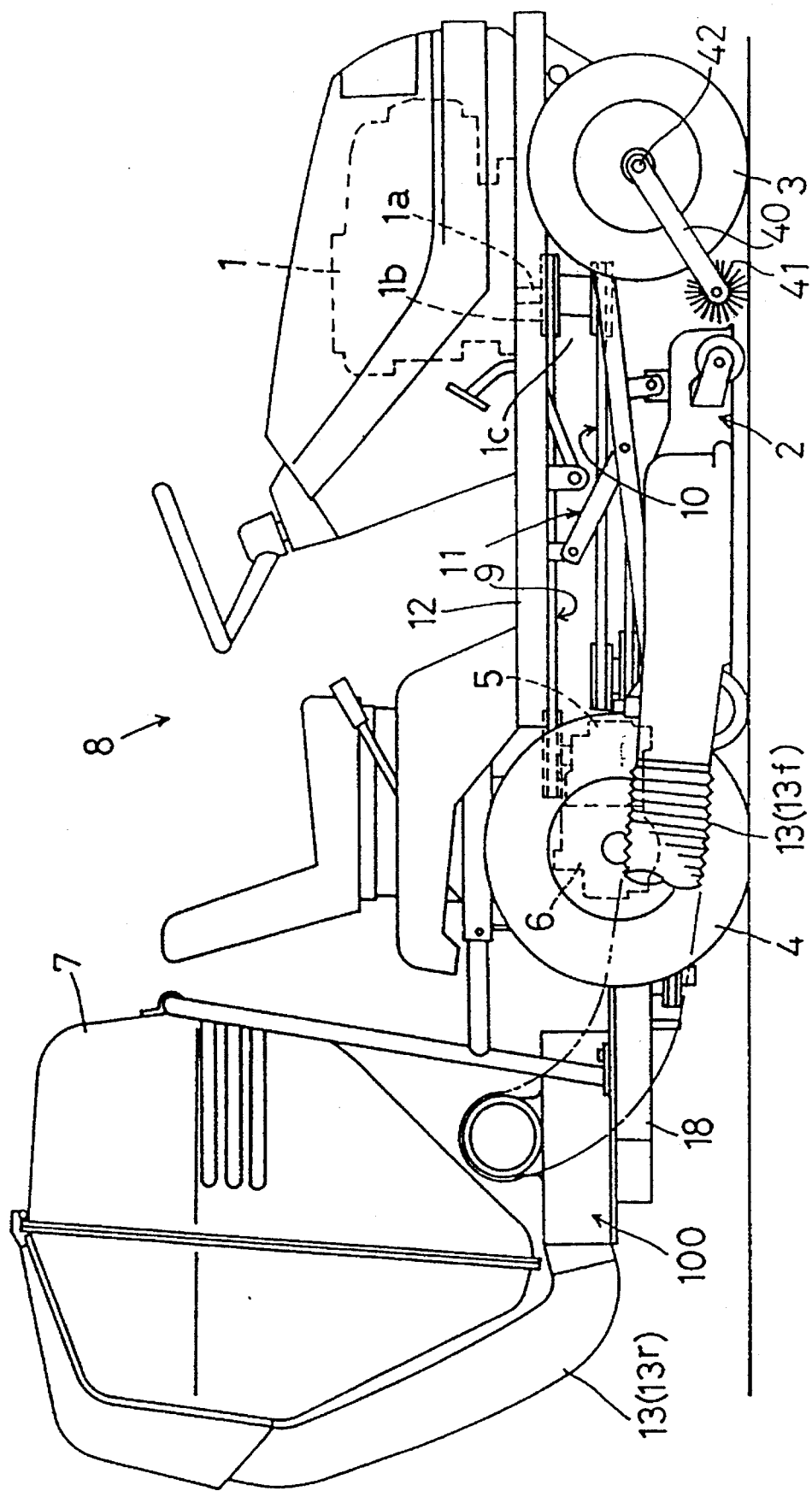
FIG. 1 is a side elevation of a mid-mount type lawn tractor according to the present invention.

FIG. 1 shows a mid-mount type lawn tractor. This lawn tractor has an engine 1 mounted on a front portion of a body frame 12 supported by front wheels 3 and rear wheels 4. The body frame 12 supports a two-blade type mower unit 2 suspended from a middle portion thereof through a link mechanism 11. The rear wheels 4 are driven by power transmitted from the engine 1 through a propelling belt transmission mechanism 9, a hydrostatic stepless transmission (hereinafter called HST) 5 and a transmission 6. As described in detail later, the mower unit 2 receives power from the engine 1 through a vertical output shaft 1a of the engine 1 and a belt transmission mechanism. A grass catcher 7 is supported on a rear portion of the body frame 12. A driver's section 8 is formed on an intermediate portion of the body frame 12.

Figure 2:
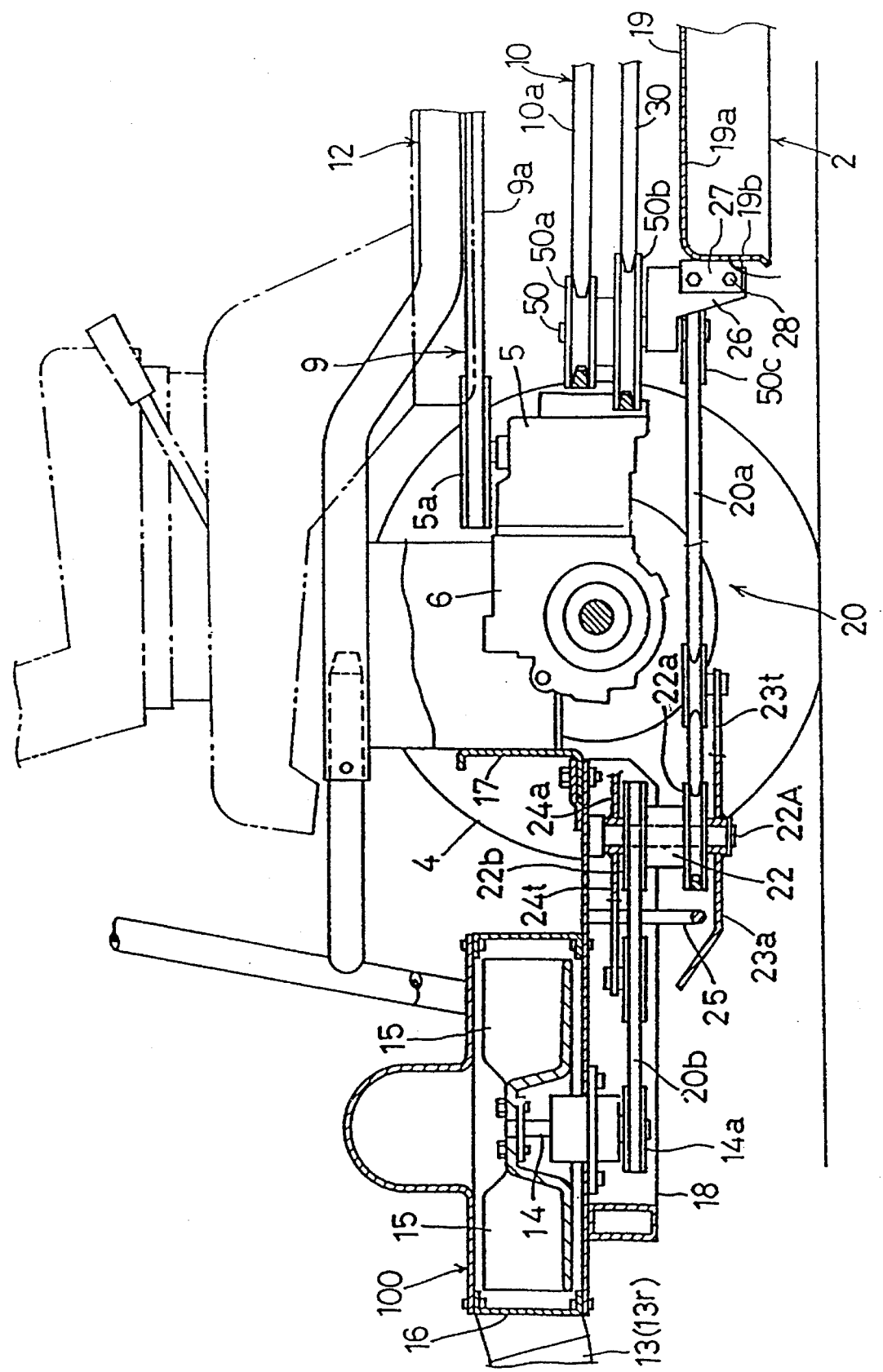
FIG. 2 is a side view showing transmission of engine power to a blower unit.

As seen from FIG. 2, the propelling belt transmission mechanism 9 for transmitting power from the output shaft 1a of the engine 1 to the HST 5 includes a first output pulley 1b mounted on an upper shank portion of the output shaft 1a, an input pulley 5a of HST 5, and a belt 9a wound around the output pulley 1b and input pulley 5a. A first belt transmission mechanism 10 for transmitting power from the engine 1 to the mower unit 2 and a blower unit 100 includes a second output pulley 1c mounted on a lower shank portion of the output shaft 1a, an input pulley 50a mounted on a vertical intermediate shaft 50 disposed rearwardly of the mower unit 2, and a belt 10a wound around the output pulley 1c and input pulley 50a. The power transmission through the first belt transmission mechanism 10 is turned on and off by a tension pulley mechanism not shown.

A blower driving output pulley 50c and a mower driving output pulley 50b are mounted on the intermediate shaft 50 under the input pulley 50a to be rotatable with the input pulley 50a.

The mower unit 2 is vertically adjustably suspended from the body frame 12 through the link mechanism 11. The mower unit 2 has a blade housing 19 extending transversely of the body frame 12. The housing 19 includes a grass outlet located at a right side of the body frame 12. This grass outlet communicates through a grass transporting duct 13 with a grass inlet of the grass catcher 7 supported on the rear portion of the body frame 12. The blower unit 100 is mounted in an intermediate position of the duct 13 for forcibly transporting grass clippings from the mower unit 2 toward the grass catcher 7. The blower unit 100 is supported on an extension frame 18 forming part of the body frame 12.

The intermediate shaft 50 is supported by a bearing holder 26. The holder 26 is attached by bolts 28 to a bracket 27 fixed to a rear wall 19b of the housing 19 of the mower unit 2. The blower driving output pulley 50c is disposed rearwardly of the housing 19 and in a level not projecting above a ceiling wall 19a of the housing 19.

Figure 3:
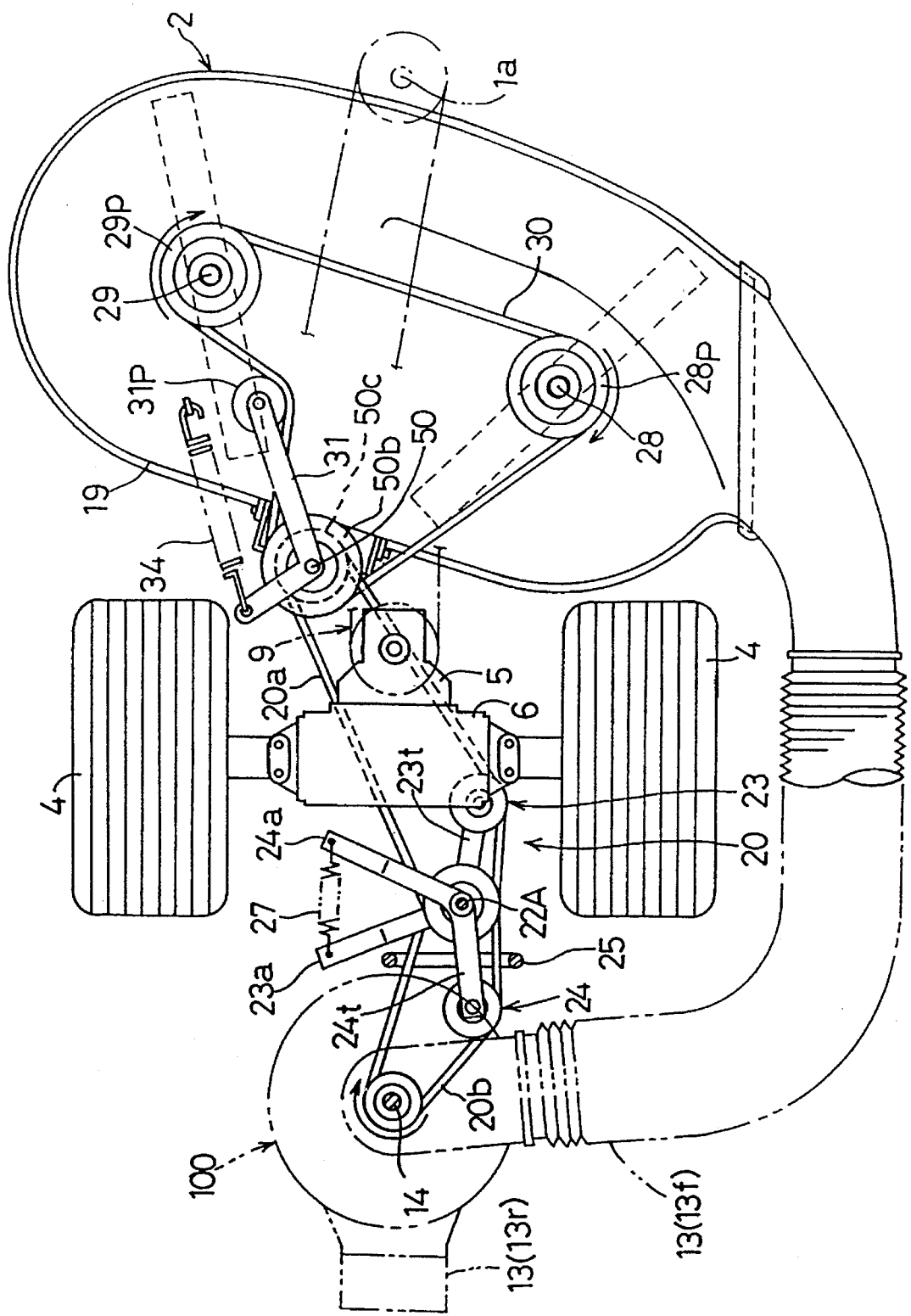
FIG. 3 is a plan view showing transmission of engine power to a mower unit and the blower unit.

As shown in FIGS. 1 through 3, the blower unit 100 has a vertical rotary shaft 14 with rotary vanes 15 arranged horizontally. The duct 13 includes a first, front duct portion 13f and a second, rear duct portion 13r. The front duct portion 13f extends from the grass output of the mower unit 2 outwardly around the right rear wheel 4 to an intake opening formed in an upper central position of the blower unit 100. The rear duct portion 13r extends from an outlet opening of a blower case 16 along a rear surface of the grass catcher 7 to the grass inlet thereof.

The blower unit 100 is supported by the body frame 12, with the blower case 16 bolted to the extension frame 18 extending rearwardly from a cross frame 17 disposed in a rear position of the body frame 12.

Power is transmitted from the first belt transmission mechanism 10 to the blower unit 100 through a second belt transmission mechanism 20. This transmission mechanism 20 includes a first endless belt 20a and a second endless belt 20b for transmitting power from the blower driving output pulley 50c rotatable with the input pulley 50a of the first belt transmission mechanism 10 to the rotary vanes 15 of the blower unit 100.

That is, power is transmitted from the first belt transmission mechanism 10 through the blower driving output pulley 50c to the endless belt 20a. Then, the power is transmitted from the endless belt 20a to the endless belt 20b through a relay sleeve shaft 22 fitted on a support axis 22A supported by the extension frame 18 on which the blower unit 100 is mounted, the second relay sleeve shaft 22 having a first relay pulley 22a and a second relay pulley 22b. Further, the power is transmitted from the endless belt 20b to a drive pulley 14a mounted on the rotary shaft 14 of the rotary vanes 15. Thus, the rotary shaft 14 acts as a vertical input shaft of the blower unit 100.

The second belt transmission mechanism 20 extends around and below the HST 5 and the transmission 6 formed integral with a rear axle case, with the endless belt 20a disposed directly under the HST 5 and transmission 6. Numeral 25 denotes a guard bar for protecting the first relay pulley 22a on the relay shaft 22 when the tractor moves backward.

As seen from FIGS. 2 and 3, the engine output shaft 1a, the intermediate shaft 50 and the blower input shaft 14 are arranged substantially linearly in the longitudinal direction of the tractor and inwardly of the rear wheels 4 in the transverse direction of the tractor. This arrangement provides a balanced arrangement of the engine 1, mower unit 2 and blower unit 100. This shaft arrangement also allows the first belt transmission mechanism 10 and second belt transmission mechanism 20 to be disposed inwardly of the rear wheels 4 in the transverse direction of the tractor.

As shown in FIG. 3, the second belt transmission mechanism 20 has belt tension mechanisms 23 and 24. The belt tension mechanism 23 includes a tension arm 23t for applying a tension to the endless belt 20a. The belt tension mechanism 24 includes a tension arm 24t for applying a tension to the endless belt 20b. The two tension arms 23t and 24t are pivotable on the support axis 22A fitted in the relay sleeve shaft 22. The tension arms 23t and 24t have proximal arm portions 23a and 24a bent upward and downward, respectively, to attain the same height, with a single tension coil spring 27 extending therebetween. Thus, the two belt tension mechanisms 23 and 24 share the single tension coil spring 27 for economy.

A drive structure of the mower unit 2 includes a pulley 28P mounted on a right blade drive shaft 28, a pulley 29P mounted on a left blade drive shaft 29, the mower driving output pulley 50b, a tension pulley 31P, and a transmission belt 30 wound around these pulleys.

The tension pulley 31P is attached to one end of a tension arm 31 which is connected at the other end thereof to the mower housing 19 through a tension coil spring 34. The tension arm 31 is oscillatable on the intermediate shaft 50 to apply an appropriate tension to the belt 30. A control lever may be connected to the tension coil spring 34 through a wire, as necessary, to control conditions of this transmission mechanism.

Figure 4:
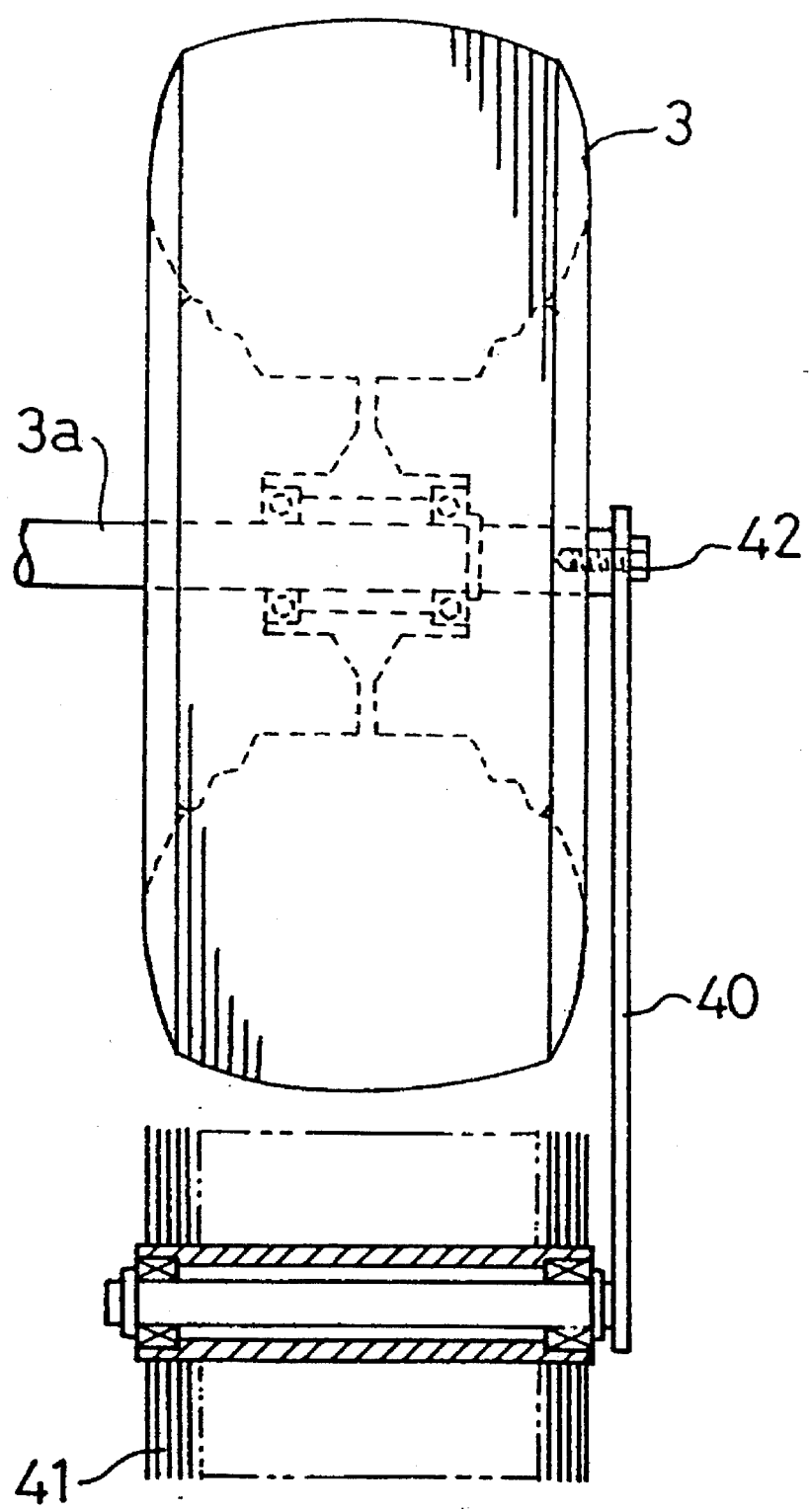
FIG. 4 is a cross section of a rotary brush.

As shown in FIGS. 1 and 4, a rotary brush 41 is disposed rearwardly of each dirigible front wheel 3 and attached to an end of an axle 3a through an arm 40. The rotary brush 41 is rotatable with movement of the tractor to pick up grass trampled down by the front wheel 3. The arm 40 is bolted as at 42 to the axle 3a to be at an adjustable angle thereto, whereby the rotary brush 41 may be set to an optimal height according to the type and length of grass.

It is possible within the scope of the present invention to replace the belt transmission mechanisms used in the foregoing embodiment, with chain transmission mechanisms or other types of transmission mechanisms.

What is claimed is:

1. A lawn tractor comprising:

an engine having a vertical output shaft;

front wheels and rear wheels;

a body frame extending longitudinally of the tractor;

a mower unit supported by said body frame and having a vertical mower drive shaft for receiving power from said engine;

a grass catcher supported by said body frame;

a blower unit supported by said body frame and having a vertical blower input shaft for receiving power from said engine;

duct means for transporting grass clippings cut by said mower unit into said grass catcher, said duct means including a first duct extending between said mower unit and said blower unit, and a second duct extending between said blower unit and said grass catcher; and an intermediate shaft disposed between said mower unit and said blower unit and having a first, a second and a third transmission wheels, said first transmission wheel being drivably connected to said vertical output shaft, said second transmission wheel being drivably connected to said mower drive shaft, and said third transmission wheel being drivably connected to said blower input shaft.

2. A lawn tractor as defined in claim 1, wherein said mower unit has a bracket mounted on a wall thereof opposed to said blower unit, said intermediate shaft being supported by said bracket.

3. A lawn tractor as defined in claim 2, wherein said third transmission wheel is disposed in a position lower than a ceiling wall of said mower unit.

4. A lawn tractor as defined in claim 3, wherein said third transmission wheel is a belt pulley attached to a lower position of said intermediate shaft, said pulley being connected to said blower input shaft through a belt extending below an axle case of said tractor.

5. A lawn tractor as defined in claim 1, wherein said vertical output shaft and said blower input shaft are arranged substantially linearly along a longitudinal axis of said tractor.

* * * * *